(12) United States Patent
Kelton

(10) Patent No.: US 9,134,926 B2
(45) Date of Patent: Sep. 15, 2015

(54) PROTECTION INFORMATION INITIALIZATION

(71) Applicant: LSI CORPORATION, San Jose, CA (US)

(72) Inventor: Allen B. Kelton, Colorado Springs, CO (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 178 days.

(21) Appl. No.: 13/889,424

(22) Filed: May 8, 2013

(65) Prior Publication Data

US 2014/0325144 A1   Oct. 30, 2014

Related U.S. Application Data

(60) Provisional application No. 61/816,088, filed on Apr. 25, 2013.

(51) Int. Cl.
*G06F 3/06* (2006.01)

(52) U.S. Cl.
CPC ............ *G06F 3/0689* (2013.01); *G06F 3/0614* (2013.01); *G06F 3/0629* (2013.01)

(58) Field of Classification Search
CPC . G06F 3/0689; G06F 3/0619; G06F 11/1076; G06F 3/0614; G06F 11/2094; G06F 11/108
USPC .......................... 711/114; 714/6.2, 6.22, 6.24
See application file for complete search history.

(56) References Cited

U.S. PATENT DOCUMENTS

| | | | |
|---|---|---|---|
| 7,225,395 B2 | 5/2007 | Henry | |
| 7,562,284 B2 | 7/2009 | Benhase et al. | |
| 8,285,923 B2 | 10/2012 | Stevens | |
| 8,656,131 B2 * | 2/2014 | Wicklund | ..................... 711/170 |
| 2013/0055054 A1 | 2/2013 | Butt et al. | |

OTHER PUBLICATIONS

Colegrove, Dan, End-to-end Data Protection, HGST Whitepaper, Apr. 2008.
Vans, Mark, Working Draft Project American National Standard, T10/1799-D, Information technology—SCSI Block Commands—3 (SBC-3), Revision 25, Western Digital Corporation, San Jose, CA, Oct. 27, 2010.

* cited by examiner

*Primary Examiner* — Jasmine Song
(74) *Attorney, Agent, or Firm* — Duft Bornsen & Fettig LLP

(57) ABSTRACT

M number of physical drives are divided into a plurality of strips. The plurality of strips each has an equal number of blocks on each of the M physical drives. Each of the strips has a first logical block address associated with a first block of the strip. The plurality of strips are grouped across the M physical drives into a plurality of stripes. Each of the stripes is configured use one strip from each of the M physical drives. A first stripe of the plurality of strips has M total strips configured as M−1 data strips and one parity strip. Protection information parity values are calculated for the parity strip in the first stripe using the respective first logical block addresses of the M−1 data strips.

17 Claims, 6 Drawing Sheets

PROTECTION INFORMATION INITIALIZATION

BACKGROUND

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID).

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SCSI/T-10 Protection Information (PI) provides a method to write 8 bytes of metadata with a logical data block to provide additional information related to the history of the block. It is a standard method to provide end-to-end data protection (EEDP). EEDP's goal is to provide assurance that the returned data is from the logical block that the data was original written to and has not been corrupted.

SUMMARY

An embodiment of the invention may therefore comprise a method of initializing a plurality of physical drives of a logical mass storage device. A plurality of physical drives are divided into a plurality of strips. These strips have an equal number of blocks. The plurality of strips are grouped into a plurality of stripes. Each of the strips have a first logical block address associated with a first block of the strip. A protection information parity value is calculated for each of the plurality of stripes using the respective first logical block addresses of the strips in the respective plurality of stripes.

An embodiment of the invention may therefore further comprise a method of initializing a plurality of physical drives of a logical mass storage device. M number of physical drives are divided into a plurality of strips. The plurality of strips each has an equal number of blocks on each of the M physical drives. Each of the strips has a first logical block address associated with a first block of the strip. The plurality of strips are grouped across the M physical drives into a plurality of stripes. Each of the stripes is configured using one strip from each of the M physical drives. A first stripe of the plurality of strips has M total strips configured as M−1 data strips and one parity strip. Protection information parity values are calculated for the parity strip in the first stripe using the respective first logical block addresses of the M−1 data strips.

DETAILED DESCRIPTION OF THE EMBODIMENTS

Figure 1:
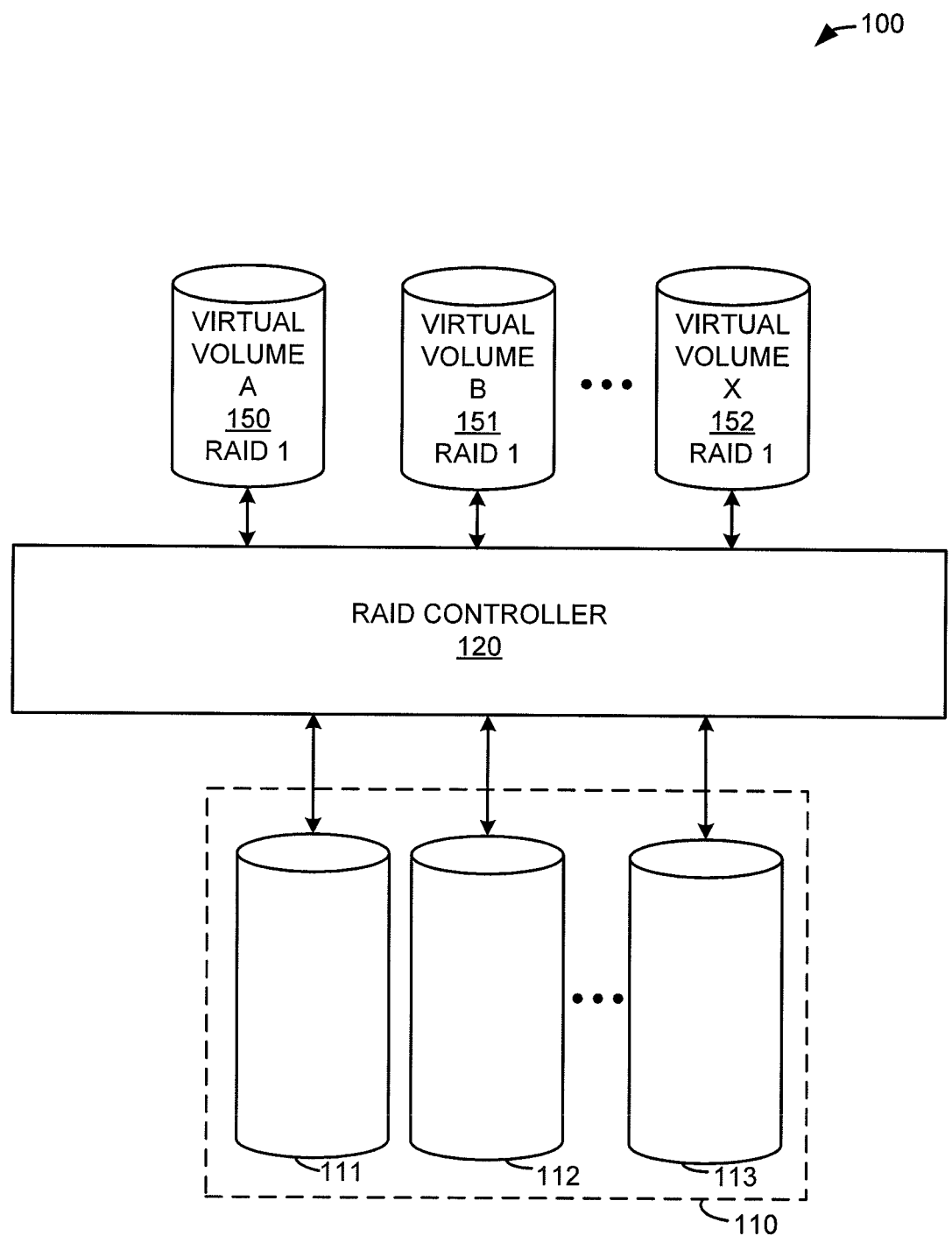
FIG. 1 is a block diagram of a storage system.

FIG. 1 is a block diagram of a storage system. In FIG. 1, storage system 100 is comprised of disk array 110, RAID controller 120, virtual volume A 150, virtual volume B 151, and virtual volume X 152. Disk array 110 includes at least first physical drive 111, second physical drive 112, and third physical drive 113. Disk array 110 may also include more disk drives. However, these are omitted from FIG. 1 for the sake of brevity. RAID controller 120 may support at least RAID levels 5 and 6. Disk array 110 and physical drives 111-113 are operatively coupled to RAID controller 120. Thus, RAID controller 120 may operate to initialize, control, span, strip, and/or stripe physical drives 111-113 into virtual volumes 150-152.

In an embodiment, storage system 100 implements end-to-end data protection (EEDP). EEDP can include error detection over cover the entire path from hosts that read/write virtual volumes 150-152 to the physical drive media of physical drives 111-113, and back. Protection information can stay with its respective data from hosts that read/write virtual volumes 150-152 through intermediate interconnection, (e.g., Fibre Channel or SAS connections), through RAID controllers, and through drive electronics to the media of physical drives 111-113. When read, the same data protection information returns with the data to a host. The protection information may be used to verify the correctness of the data at multiple points in the path from the media of physical drives 111-113 to the hosts that read/write virtual volumes 150-152. Protection information is described in AMERICAN NATIONAL STANDARD T10/1799-D INFORMATION TECHNOLOGY—SCSI BLOCK COMMANDS-3 (SBC-3) Revision 25, Oct. 27, 2010, available from www.t10.org (incorporated by reference herein for all purposes).

Four types of protection may be defined: (a) Type-0—no protection; (b) Type0-1—protection is enabled and the 32-byte commands are not valid; (c) Type-2—protection is enabled and only the 32-byte commands are valid; and, (d) Type-3—protection is enabled and the 32-byte commands are not valid. For Type-3 protection, the reference tag is not defined and may be used as an extension of the application tag. Physical drives 111-113 will not check the reference tag when using Type-3 protection.

In an embodiment, physical drives 111-113 are being used with Type-2 protection. Thus, the reference tag is the lower 32 bits of the logical or physical drive logical block address (LBA). The logical-to-physical block striping between virtual volumes 150-152 and physical drives 111-113 is grouped so that a strip of blocks on physical drives 111-113 represents a power-of-2 (i.e., $2^N$) virtual volume 150-152 blocks. Corresponding identically sized strips across physical drives 111-113 are grouped as stripes. At least one strip in each stripe is used to store parity for the stripe. The protection information associated with the blocks in the parity strips in each of the stripes is an exclusive-OR (XOR) of the protection information fields of the corresponding data blocks in the non-parity strips of the stripe. If the protection information associated with a selected data block needs to be recovered, an XOR of the protection information fields of the corresponding block in the parity strip and the remaining corresponding blocks in the non-parity strips recovers the protection information of the selected block.

Figure 2:
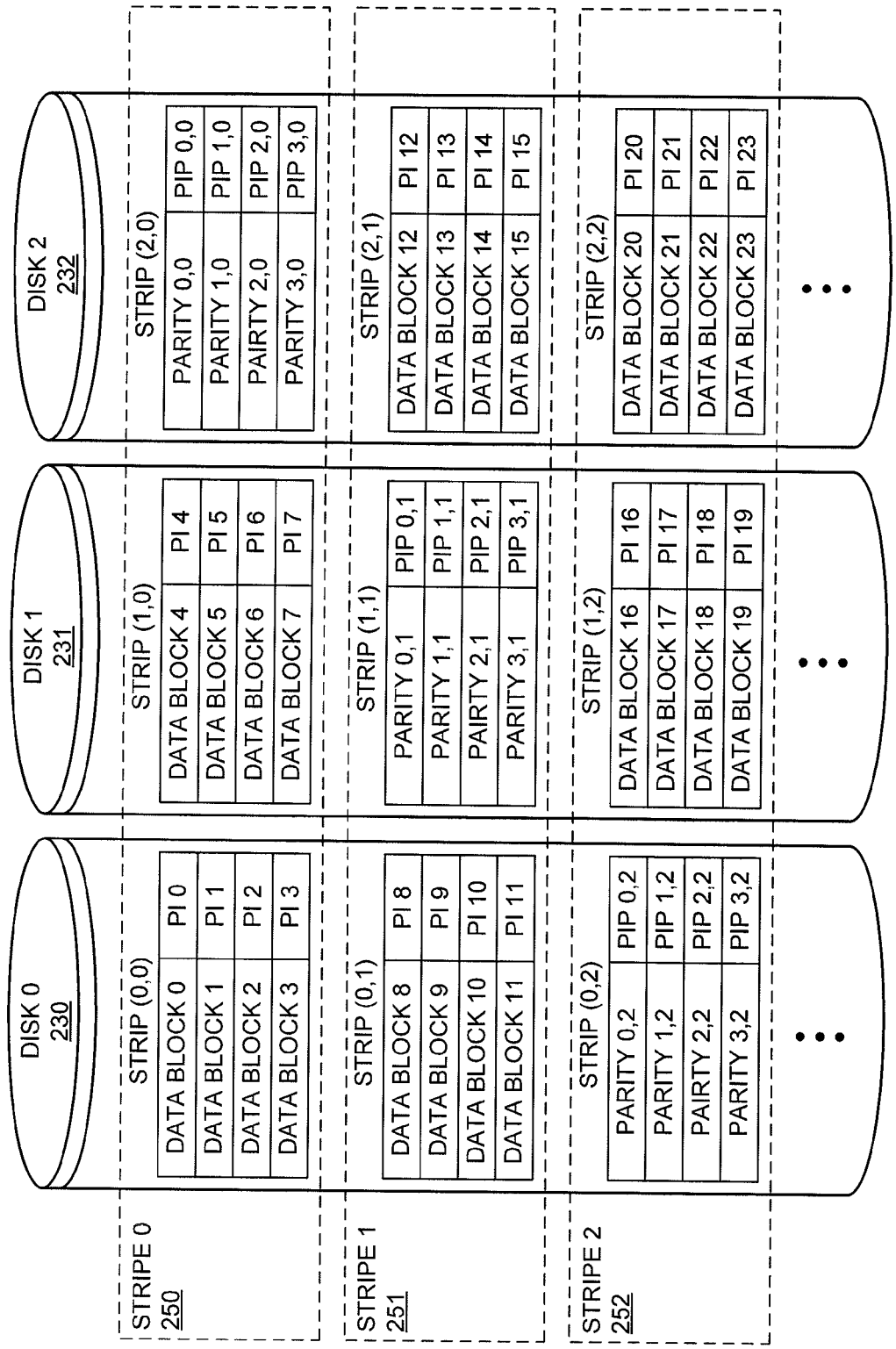
FIG. 2 is an illustration of a RAID layout of protection information, RAID stripes, and strips.

FIG. 2 is an illustration of a RAID layout of protection information, RAID stripes, and strips. In FIG. 2, RAID layout 200 is performed across three (3) physical disks (extents) 230-232. The blocks of each disk 230-232 is grouped into equal sized strips (i.e., each strip on each of disks 230-232 has the same number of data blocks). Each of the blocks on each of disks 230-232 also includes protection information. In FIG. 2, each strip is numbered according to its disk number and strip number. In other words, disk 0 230 has strip (0,0), strip (0,1), strip (0,2) ... (strip 0,N); disk 1 has strip (1,0), strip (1,1), strip (1,2) ... (strip 1,N); etc. where N is an arbitrary integer number corresponding to the number of strips that the blocks of each disk 230-232 are grouped into. Also in FIG. 2, the strips of disks 230-232 are grouped across disks 230-232 into stripes 250-252. This is illustrated by way of example in FIG. 2 where the dashed line box corresponding to stripe 0 250 encompasses strip (0,0) on disk 0 230, strip (1,0) on disk 1 231, and strip (2,0) on disk 232.

In each stripe 250-251 shown in FIG. 2, one strip is used for parity blocks (and protection information parity). This is illustrated by way of example in FIG. 2 where strip (0,0) is shown with data blocks 0-3 and associated protection information (PI) 0-3, strip (1,0) is shown with data blocks 4-7 and associated protection information (PI) 4-7, and strip (2,0) is shown with parity (1-3,0) and protection information parity (1-3,0). Similar layouts (with rotating parity strips) are shown for stripe 1 251 and stripe 2 252.

The protection information of the strips on disks 230-232 may be implemented using eight bytes of data appended to each data block stored on the media of a disk 230-232. These eight bytes may be divided into three fields: (1) the guard, (2) the reference tag, and, (3) the application tag. The protection data is created by a host or controller and is transmitted with data blocks, and written to the media of disks 230-232. The guard field protects against errors in the data. The two-byte guard field is a Cyclic Redundancy Check (CRC) on the data in the data block. This allows each device along the path from media of disk 230-232 to a host that read/writes data stored on disks 230-232 to check that the data in the block is still correct.

Figure 3:
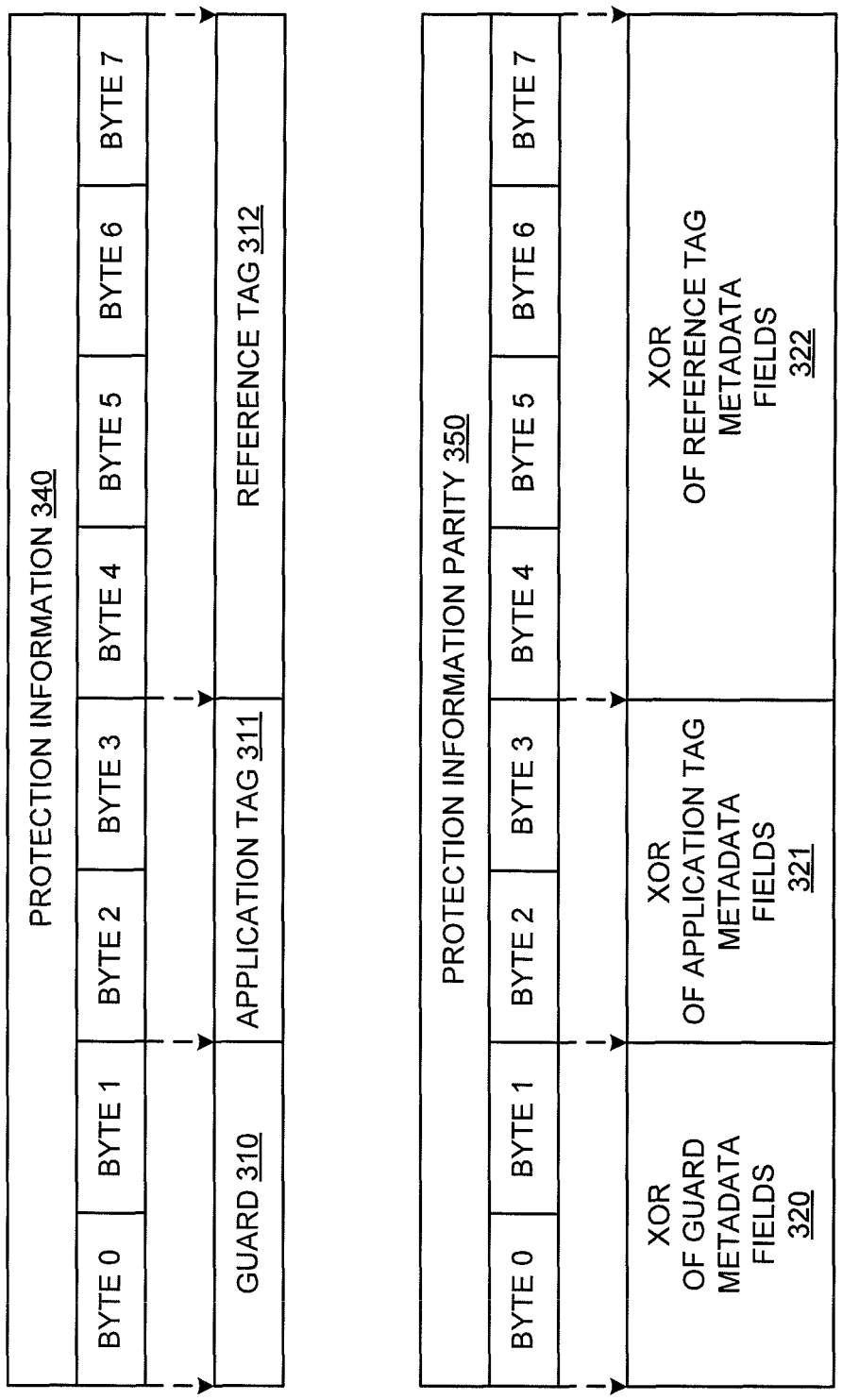
FIG. 3 is a diagram illustrating protection information fields and protection information parity fields.

FIG. 3 is a diagram illustrating protection information fields and protection information parity fields. In FIG. 3, protection information 340 is illustrated. The protection information format and contents are detailed in the SBC-3 standard referenced herein. As illustrated in FIG. 3, protection information 340 includes eight bytes of information. These eight bytes of protection information 340 include two bytes of a guard field 310, two bytes of an application tag field 311, and four bytes of reference tag field 312. In FIG. 2, protection information parity 350 is also illustrated. Protection information parity 350 includes eight bytes of information so it corresponds to, and is stored in, storage space associated with protection information 340. These eight bytes of protection information parity 350 include two bytes of an XOR of the guard metadata fields 320 of the corresponding protection information for the non-parity blocks in the non-parity strips of a stripe; two bytes of an XOR of the application tag fields 321 of the corresponding protection information for the non-parity blocks in the non-parity strips of the stripe, and four bytes of an XOR of the reference tag fields 322 of the corresponding protection information for the non-parity blocks in the non-parity strips of the stripe.

Table 1 illustrates a mapping of logical drive (e.g., virtual volumes 150-152) LBAs to physical drives (e.g., physical drives 110-113) for a five (5) member RAID-5 layout (i.e., M=5). $P_Q$ represents the parity strip for the stripe #Q. Note that in Table 1, the position of the parity strip rotates for each successive strip number. Thus, the location of Parity strip #Y will depend on the value of Y.

TABLE 1

| | Strip size of $2^N$ | | # of Drives = M = 5 | | | |
|---|---|---|---|---|---|---|
| Stripe # | Physical drive LBA #s | Disk #0 | Disk #1 | Disk #2 | Disk #3 | Disk #4 |
| 0 | 0 to $2^N - 1$ | 0 to $2^N - 1$ | $2^N$ to $2 \times 2^N - 1$ | $2 \times 2^N$ to $3 \times 2^N - 1$ | $3 \times 2^N$ to $4 \times 2^N - 1$ | $P_0$ |
| 1 | $2^N$ to $2 \times 2^N - 1$ | $P_1$ | $4 \times 2^N$ to $5 \times 2^N - 1$ | $5 \times 2^N$ to $6 \times 2^N - 1$ | $6 \times 2^N$ to $7 \times 2^N - 1$ | $7 \times 2^N$ to $8 \times 2^N - 1$ |
| 2 | $2 \times 2^N$ to $3 \times 2^N - 1$ | $8 \times 2^N$ to $9 \times 2^N - 1$ | $P_2$ | $9 \times 2^N$ to $10 \times 2^N - 1$ | $10 \times 2^N$ to $11 \times 2^N - 1$ | $11 \times 2^N$ to $12 \times 2^N - 1$ |
| ... | ... | ... | ... | ... | ... | ... |
| Y - 1 | $(Y - 1) \times 2^N$ to $Y \times 2^N - 1$ | $(Y - 1) \times 2^N$ to $Y \times 2^N - 1$ | $Y \times 2^N$ to $(Y + 1) \times 2^N - 1$ | $(Y + 1) \times 2^N$ to $(Y + 2) \times 2^N - 1$ | $P_Y$ | $(Y + 2) \times 2^N$ to $(Y + 3) \times 2^N - 1$ |

Note that since the first block of each strip 250-252 is aligned to block number $2^N$, the LBA for the first block in each strip has the format given in Table 2. Where the bits with the Z notation are arbitrary values corresponding to the LBA of the strip, can be different from bit-to-bit, but are constant over a stripe.

TABLE 2

| Bit # | | | | | | | | |
|---|---|---|---|---|---|---|---|---|
| 31 | | ... | N + 1 | N | ... | 2 | 1 | 0 |
| Z | ZZZZZZZZZZZZZZZZZZZZ | Z | 0 | 000000 | 0 | 0 | 0 | |

The format for LBA for the last block in each strip has the format given in Table 3. Where the bits with the Z notation are the same arbitrary values corresponding to the LBA of the strip given in Table 2. As can be seen from Table 2 and Table 3, the bits of a logical block address that change over a strip are limited to bits 0 through N. Bits N=1 through 31 are the same for each block within a strip.

TABLE 3

| | | Bit # | | | | | |
|---|---|---|---|---|---|---|---|
| 31 | ... | N+1 | N | ... | 2 | 1 | 0 |
| Z ZZZZZZZZZZZZZZZZZZZZZ | | Z | 1 | 111111 | 1 | 1 | 1 |

Because, over the blocks of a strip, the logical disk LBA consist of a changing portion (i.e., bits 0 . . . N) and a non-changing portion (i.e., bits N+1 . . . 31), the LBA values can be represented by $(A_D \oplus \text{Offset}_D)$, where $A_D$ is bits N+1 . . . 31 and 0 for bits 0 through N. $\text{Offset}_D$ starts at zero (0) and increments to $2^{N-1}$ at the end of a strip. The parity calculation for the reference tag portion of the protection information for a strip is $P_{ref\text{-}tag}=(A_D\oplus\text{Offset}_D)\otimes(A_{D+1}\oplus\text{Offset}_{D+1})\otimes(A_{D+2}\oplus\text{Offset}_{D+2})\ldots\otimes(A_{D+M-1}\oplus\text{Offset}_{D+M-1})$ where M is the number of drives. This equation can be rewritten as: $P_{ref\text{-}tag}=(A_D\otimes A_{D+1}\otimes\ldots A_{D+M-1})\oplus(\text{Offset}_D\otimes\text{Offset}_{D+1}\otimes\ldots\text{Offset}_{D+M-1})$. $\text{Offset}_D$ is the same for each drive. Thus, bits 0 . . . N of the XOR of the offset portion of the reference tag metadata fields 322 is 0 (zero) for an even number of drives (i.e., M is even), or the number of blocks form that star of the strip for an odd number of drives (i.e., M is odd). Bits N+1 . . . 31 of the reference tag parity, can be calculated by XORing the logical disk LBA for just the starting block of each strip in the stripe for which the parity is being calculated. In other words, Bits N+1 . . . 31 of the XOR of the reference tag metadata fields 322 can be obtained from the logical disk logical block address numbers without regard to the data stored (or will be stored) in the corresponding data blocks.

Figure 4:
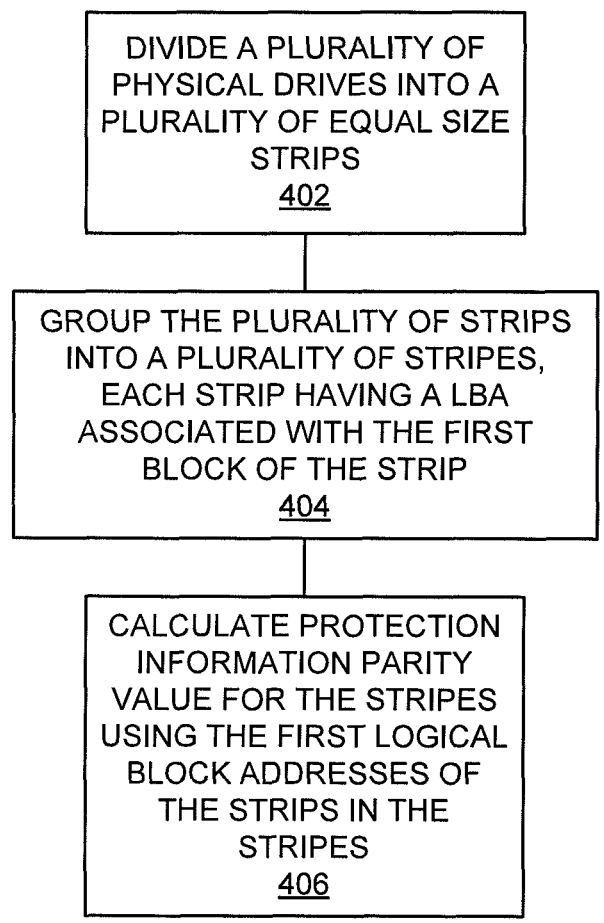
FIG. 4 is a flowchart illustrating a method of initializing a plurality of physical drives.

FIG. 4 is a flowchart illustrating a method of initializing a plurality of physical drives. The steps illustrated in FIG. 4 may be performed by one or more elements of storage system 100. A plurality of physical drives are grouped into a plurality of equal size strips (402). For example, storage system 100 may group physical drives 111-113 into strips as detailed in Table 1. In another example, storage system 100 may group physical drives 111-113 into strip (0,0), strip (0,1), etc., as shown in FIG. 2.

The plurality of strips are grouped into a plurality of stripes, each strip having a logical block address associated with the first block of the strip (404). For example, storage system 100 may group the strips on physical drives 111-113 into stripes. Each of these stripes includes strips that have a first block of the strip (e.g., in FIG. 2, stripe 0 250 has data block 0 as the first block of strip (0,0) and data block 4 as the first block of strip (1,0)). Each of these first blocks of a strip in a stripe is associated with a logical block address. This is illustrated in FIG. 2 by the data block number (e.g., data block 0, data block 1, etc.).

Protection information parity values are calculated using the first logical block addresses of the strips in the stripes (406). For example, protection information parity value PIP 0,0 is calculated using the LBAs of data block 0 and data block 4. In another example, the protection information parity value associated with $P_0$ (from Table 1) is calculated using the LBAs of the first blocks in stripe #0 to calculate a part of the parity for the reference tag. In other words, the part of $P_0$ associated with the reference tag stored on disk #4 is calculated as $0 \otimes 2^N \otimes 2\times 2^N \otimes 3\times 2^N$. These portions of the parity for the reference tag may be used to initialize physical drives 111-113.

Figure 5:
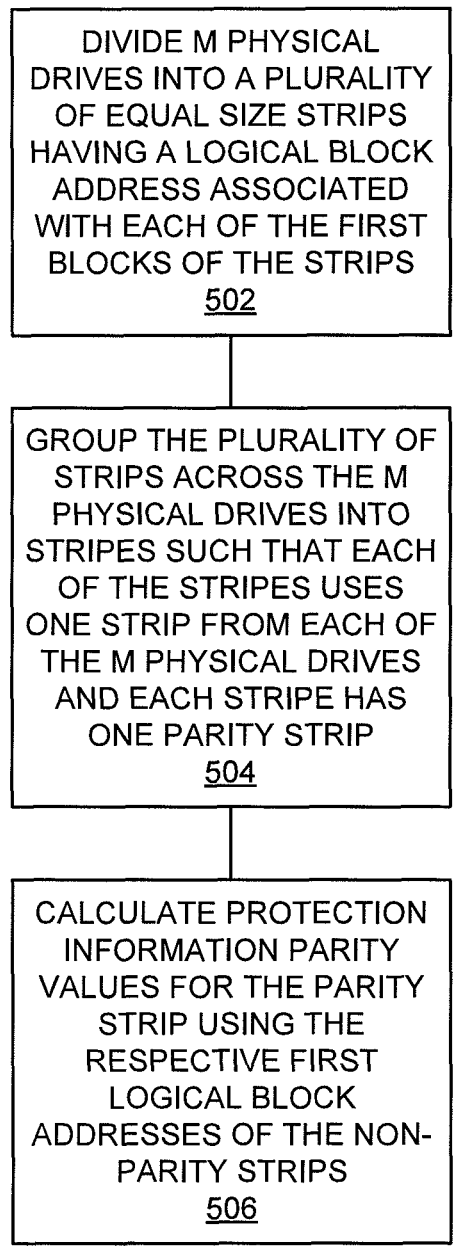
FIG. 5 is a flowchart illustrating a method of initializing physical drives.

FIG. 5 is a flowchart illustrating a method of initializing physical drives. The steps illustrated in FIG. 5 may be performed by one or more elements of storage system 100. M number of physical drives are divided into a plurality of equal size strips having a logical block address associated with each of the first block of the strips (502). For example, storage system 100 may group physical drives 111-113 into strips as detailed in Table 1. In another example, storage system 100 may group physical drives 111-113 into strip (0,0), strip (0,1), etc., as shown in FIG. 2.

The plurality of strips are grouped across the M physical drives into stripes such that each of the stripes uses on strip form each of the M physical drives and each stripe has one parity strip (504). For example, storage system 100 may group the strips on physical drives 111-113 into stripes. Each of these stripes includes strips that are used for data and one strip that is used for parity. Likewise, as shown in Table 1 where there are five physical drives (and thus 5 strips per stripe), each stripe includes four strips dedicated to data and one strip for parity information.

Protection information parity values for the parity strip are calculated using the respective first logical block addresses of the non-parity strips (506). For example, protection information parity value PIP 0,0 is calculated using the LBAs of data block 0 and data block 4. In another example, the protection information parity value associated with $P_0$ (from Table 1) is calculated using the LBAs of the first blocks in stripe #0 to calculate a part of the parity for the reference tag. In other words, a part of $P_0$ associated with the reference tag stored on disk #4 is calculated as $0\otimes 2^N \otimes 2\times 2^N \otimes 3\times 2^N$. These portions of the parity for the reference tag may be used to initialize physical drives 111-113.

The methods, systems, hosts, networks, interconnections, and controllers described above may be implemented with, contain, or be executed by one or more computer systems. The methods described above may also be stored on a non-transitory computer readable medium. Many of the elements of storage system 100 may be, comprise, or include computers systems. This includes, but is not limited to: physical drives 111-113 and/or RAID controller 120.

Figure 6:
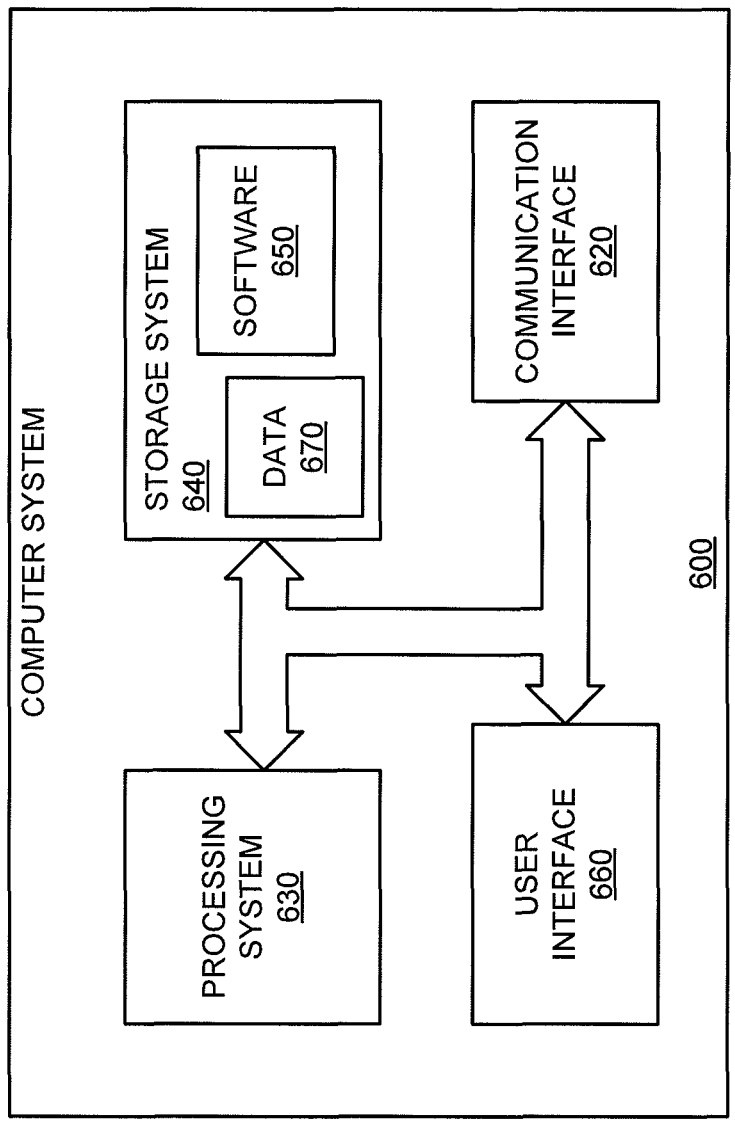
FIG. 6 is a block diagram of a computer system.

FIG. 6 illustrates a block diagram of a computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, network storage, server, or other memory function. Storage system 640 may be a computer readable medium. Storage system 640 may be distributed among multiple memory devices.

Processing system 630 retrieves and executes software 650 from storage system 640. Processing system 630 may retrieve and store data 670. Processing system 630 may also retrieve and store data via communication interface 620. Processing system 630 may create or modify software 650 or data 670 to achieve a tangible result. Processing system 630 may control communication interface 620 or user interface 660 to achieve a tangible result. Processing system 630 may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of initializing a plurality of physical drives of a logical mass storage device, comprising: dividing a plurality of physical drives into a plurality of strips, the plurality of strips having an equal number of blocks;
    grouping the plurality of strips into a plurality of stripes, each of the strips having a first logical block address associated with a first block of the strip; and,
    calculating a protection information parity value for each of the plurality of stripes using the respective first logical block addresses of the strips in the respective plurality of stripes,
    wherein a lower order number of bits of the protection information parity value is a number of blocks from the start of a strip when there is an odd number of drives in the plurality of physical drives.

2. The method of claim 1, wherein the number of blocks in a strip is a power of 2.

3. The method of claim 1, wherein a lower order number of bits of the protection information parity value is zero for an even number of drives in the plurality of physical drives.

4. The method of claim 1, further comprising:
    storing the protection information parity value in an end-to-end data protection field associated with each block in a strip of the plurality of stripes.

5. The method of claim 4, wherein the strip of the plurality of stripes storing the protection information parity value is on a different physical drive for stripes grouped from strips having consecutive block address ranges.

6. The method of claim 1, wherein the plurality of stripes are configured to implement RAID 5 data protection.

7. The method of claim 1, wherein the plurality of stripes are configured to implement RAID 6 data protection.

8. A method of initializing a plurality of physical drives of a logical mass storage device, comprising:
    dividing M physical drives into a plurality of strips, the plurality of strips each having an equal number of blocks on each of the M physical drives, each of the strips having a first logical block address associated with a first block of the strip;
    grouping the plurality of strips across the M physical drives into a plurality of stripes, each of the stripes configured using one strip from each of the M physical drives, a first stripe of the plurality of strips having M total strips configured as M−1 data strips and one parity strip; and,
    calculating protection information parity values for the parity strip in the first stripe using the respective first logical block addresses of the M−1 data strips,
    wherein a lower order number of bits of the protection information parity values are zero when M is an even number.

9. The method of claim 8, wherein the number of blocks in each of the plurality of strips is a power of 2.

10. The method of claim 8, wherein a lower order number of bits of the protection information parity values are a number of blocks from the start of a strip when M is an odd number.

11. The method of claim 8, further comprising:
    storing the protection information parity values in an end-to-end data protection field associated with each block in the parity strip.

12. The method of claim 8, wherein the plurality of stripes are configured to implement RAID 5 data protection.

13. The method of claim 8, wherein the plurality of stripes are configured to implement RAID 6 data protection.

14. A storage system, comprising:
    a storage controller;
    a plurality of physical drives coupled to the storage controller, the storage controller configured to initialize a logical mass storage device by a process comprising:
    dividing M physical drives into a plurality of strips, the plurality of strips each having an equal number of blocks on each of the M physical drives, each of the strips having a first logical block address associated with a first block of the strip;
    grouping the plurality of strips across the M physical drives into a plurality of stripes, each of the stripes configured using one strip from each of the M physical drives, a first stripe of the plurality of strips having M total strips configured as M−1 data strips and one parity strip; and,
    calculating protection information parity values for the parity strip in the first stripe using the respective first logical block addresses of the M−1 data strips, wherein a lower order number of bits of the protection information parity values are a number of blocks from the start of a strip when M is an odd number.

15. The system claim 14, wherein the number of blocks in each of the plurality of strips is a power of 2.

16. The system of claim 14, wherein a lower order number of bits of the protection information parity values are zero when M is an even number.

17. The system of claim 14, wherein the storage controller is further configured to:
   store the protection information parity values in an end-to-end data protection field associated with each block in the parity strip.

* * * * *